United States Patent [19]

Malan

[11] 3,897,012
[45] July 29, 1975

[54] PULPING MACHINES

[75] Inventor: Johannes Daniel Malan, Stellenbosch, South Africa

[73] Assignee: Tobacco Research and Development Institute Limited, Zug, Switzerland

[22] Filed: Dec. 27, 1973

[21] Appl. No.: 428,913

[30] Foreign Application Priority Data

Jan. 17, 1973 South Africa.................... 73/0336
May 7, 1973 South Africa.................... 73/3072
Aug. 31, 1973 South Africa.................... 73/5997

[52] U.S. Cl............................ 241/27; 241/188 A
[51] Int. Cl.²................................... B02C 1/06
[58] Field of Search................... 241/188 A, 27

[56] References Cited
UNITED STATES PATENTS

| | | | |
|---|---|---|---|
| 1,272,473 | 7/1918 | Lombard...................... | 241/188 A |
| 1,724,895 | 8/1929 | Beach......................... | 241/188 A |

*Primary Examiner*—Roy Lake
*Assistant Examiner*—DeWalden W. Jones
*Attorney, Agent, or Firm*—Young & Thompson

[57] ABSTRACT

Grapes are pulped to must in a machine composed of two vertical discs. One disc is fixed and the other rotates about a horizontal axis. The discs both carry a series of pegs mounted in concentric rows. The pegs intercallate and the clearance between pegs and the tops of pegs and discs are such as to be bigger than the grape pips. Preferably the pegs are inclined to the disc surfaces. Those on the fixed disc are inclined towards the periphery and against the direction of rotation while the pegs on the other discs are also inclined towards the periphery, but in the direction of rotation. The grape berries are fed in towards the centre of the discs and pulp leaves at the periphery. In the result pips pass through unharmed but grape skins are comminuted and cleared of flesh.

8 Claims, 5 Drawing Figures

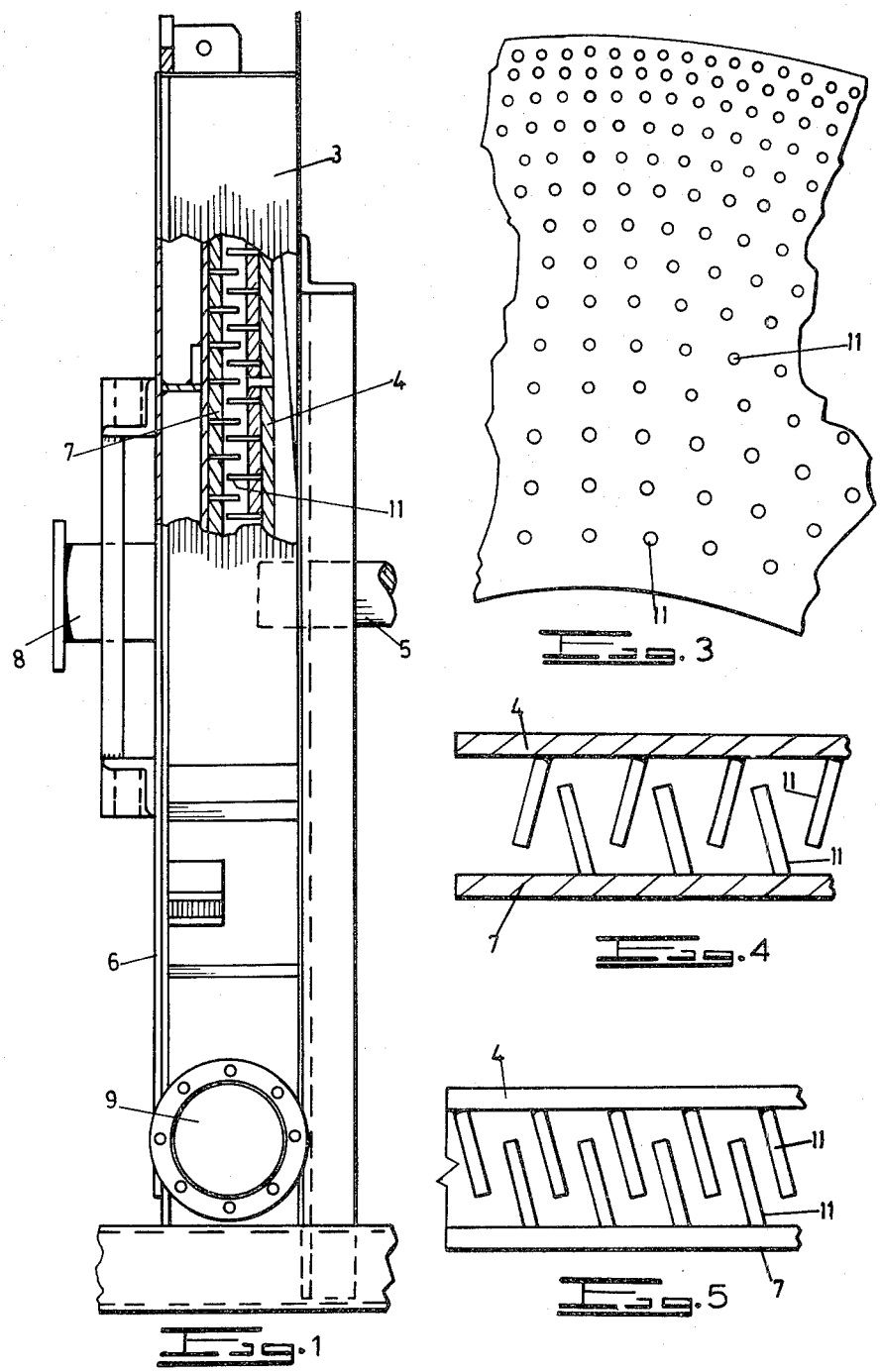

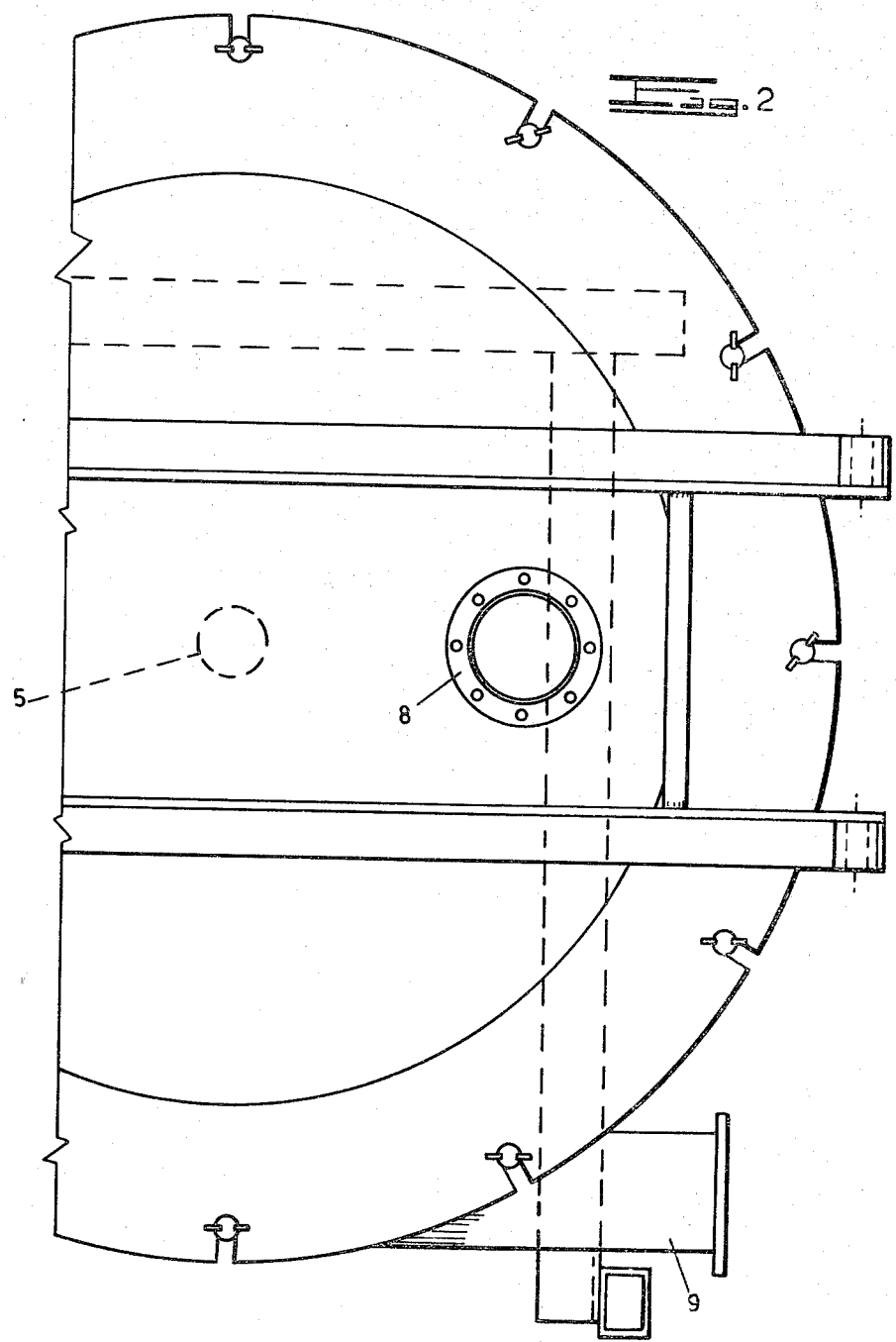

PULPING MACHINES

THIS invention relates to the pulping of fruit for the purposes of making beverages from the pulp. An example of a process to which the invention is applicable is the turning of grapes into must.

Conventionally grapes that are to be turned into must are first stemmed, and the stemmed grapes are then passed through crushing rolls. These rolls are set to a width sufficient to split the berry by pressure, but not so small as to damage the seed. The result is that small and softer berries pass or are squeezed through without the skin splitting. Even though there is a speed differential between the rolls to achieve a rubbing action, in practice the tendency is for the berry to be split only and the skin then collapses around the pip. Thus the skin forms an envelope that traps the pips and some of the flesh of the berry. This is especially so with grape varieties that have firm berries.

Where fermentation is conducted with skin contact, a percentage of the enclosed flesh is subjected to fermentation, but some of it passes through without change. When fermenting without skin contact, skins and seeds are pressed to recover must. Examination of the pressed product reveals that some of these envelopes pass through without apparent change.

There have been proposals to pass grape berries to some form of hammer mill to ensure more efficient rupturing of the skin — see French Pat. Nos. 440,403 and 1,008,654. However, these proposals do not appear to have come into commercial use, probably because of the fact that pips are also broken up with a very deleterious effect on the quality of the must.

An object of the invention is to provide a machine in which the grapes can be so pulped that the skin is reduced to small pieces without damage to the pips.

While the invention has been devised and is described in this specification with special reference to the pulping of grapes, it is also suitable for pulping other fruits, such as apples, in which the skin is required to be present in the ultimate fruit pulp.

The present invention provides a method of pulping fruit by introducing it between two opposed, spaced apart and relatively moving surfaces at least one of which carries a series of spaced pegs projecting from it towards the other surface, and causing the fruit to move along an extended path between the surfaces intersecting the line of relative movement of the pegs, the distance between pegs and the distance between the tips of the pegs and the opposed surface being so chosen that the pips of the fruit are not damaged in passing between the pegs and between the pegs and the opposed surface.

A fruit pulping machine according to the invention comprises first and second opposed surfaces movable relatively to one another at a fixed distance apart, a series of pegs projecting from at least the first surface, an inlet for fruit at a first position where fruit is fed between the surfaces, and an outlet for pulp at a second position spaced from the first so located that fruit moving from the first to the second positions intersect the line of movement of the pegs, the distance between pegs and the distance between the tips of the pegs and the opposed surface being so chosen that the pips of the fruit are not damaged in passing between the pegs and between the pegs and the opposed surface.

The second surface may be smooth, but should at least be roughened as by flat studs intercalated with the pegs. In the preferred form of the invention each surface carries pegs in which case the distances between pegs are so chosen that each peg passes any other peg at a distance greater than the expected pip diameter. In other words, this preferred form of the invention resembles a Kek mill of the kind described by Coulson & Richardson in Chemical Engineering, Volume 11, at page 884.

In the preferred form of the invention each surface is provided by a disc at least one of which is rotating, the inlet being towards the centre of the discs and the outlet towards the periphery so that centrifugal action serves to assist in moving the pulp from inlet to outlet, but along an extended path.

In the latter preferred embodiment the pegs are preferably round and cylindrical with the spacing between the pegs and the diameter of the pegs decreasing from the centre towards the periphery of the discs.

The invention is further discussed with reference to the accompanying drawings, in which FIG. 1 is an end view with parts broken away of a machine according to the invention, FIG. 2 is a fragmentary front view of the machine of FIG. 1, FIG. 3 is a fragmentary face view of a disc for use with the machine of FIG. 1 and 2, FIG. 4 is a fragmentary section through a portion of the periphery of a pair of discs, and FIG. 5 is an end on view of a portion of the periphery of a pair of discs.

The machine illustrated in FIGS. 1 and 3 has a casing 3 inside which there rotates a disc 4 mounted on a shaft 5.

The shaft 5 is suitably driven by means not shown.

The casing 3 is closed by a lid 6 which carries a fixed disc 7. The lid 6 closes on the casing by a mechanism (not shown) allowing it to move in parallel during the last stages of closing so that the pins discussed later on do not foul.

The lid 6 also has an inlet 8 for grapes to be crushed while the casing has an outlet 9.

Each disc 7 and 4 is provided with a series of concentric pegs 11 as shown more clearly in FIG. 2. As shown the pegs 11 towards the centre of the discs are stouter and spaced apart a greater distance than those towards the periphery. The pegs 11 of the discs 4 and 7 are intercalated so that a ring of pegs on the disc 4 moves midway between two rings of pegs on the disc 7.

The heads of the pegs are spaced from the opposed disc. This spacing and the minimum spacing between pegs is of the order of 5mm to ensure that pips are not crushed by the pegs.

In operation stemmed grape berries to be pulped are fed in at the inlet 8 while the pulp leaves the outlet 9. The feed to the inlet 8 could be a force feed while the outlet 9 can be into a suitable closed vessel. Thus oxidation of the pulp can be kept to a minimum.

The machine is largely self-clearing especially with the use of a horizontal axis of rotation, as shown. A vertical axis could be used, but then some of the self-clearing property may be lost.

As illustrated in FIGS. 1 to 3 the pegs are normal to the disc surfaces. However, in practice in the case of grapes it has been found that better results are obtained with the configuration illustrated in FIGS. 4 and 5. In these FIGS. the pegs 11 are so mounted on the discs that they are inclined to the disc surfaces. The pegs on the disc 4 are inclined towards the periphery (FIG. 4) and against the direction of rotation as indicated by the arrow A in FIG. 5. The pegs 11 on the disc 7 are also inclined towards the periphery but in the direction of rotation as shown in FIG. 5.

In the embodiment of FIGS. 4 and 5 the pegs are so chosen that the clearance between their heads and the opposed discs and between individual pegs where they pass at their closest is not more than about 5mm.

The pegs 11 make angles of 75° to the discs on which they are mounted.

The fineness of comminution depends on the number of pegs on the discs as well as the peripheral speed. The pegs need not all be of the same length. If a certain number, say every second or third peg, is shorter than the others, the throughput may be increased.

A pulping machine according to the teachings of FIGS. 1 to 5 was built and tested during the 1973 wine grape season at the Western Cape in South Africa. The details of the machine are as follows:

Disc diameter: 915 mm.
Distance of inlet centre from to disc centre: 250 mm.
Speed of rotation: 100, 150, 200 and 600 r.p.m.
Distance between discs: 20 mm.
Feed rate per hour: 35000 kg/hour.

Various peg configurations were tried as follows:

Configuration 1: Annular rows of pegs on each disc 25 mm apart and the rows spaced about 25 mm apart. Peg diameter 3,2 mm.

Configuration 2: The disc is divided into two concentric annuli. The inner annulus had an inner row of pegs 20 mm apart. Each subsequent row contained the same number of pegs inserted on the radius line to the periphery. Each row of pegs was 20 mm apart. Peg diameter 4 mm. The outer annulus had pegs 20 mm apart in each row and the rows were 20 mm apart. Peg diameter 3,2 mm.

Configuration 3: Again two annular sections were used. The inner annulus was like configuration 1 and the outer annulus like the outer annulus of configuration 2.

Configuration 4: Again two annular sections. The inner section was similar to the inner section of configuration 2 and the outer section similar to configuration 1.

The particle size resulting from each configuration was tested and the results are given below:

| | Percentage by weight | | |
|---|---|---|---|
| | Small | Medium | Large |
| Test Peg configuration 1 | 7,6 | 78,1 | 14,3 |
| Test Peg configuration 2 | 2,8 | 85,9 | 11,3 |
| Test Peg configuration 3 | 2,4 | 86,0 | 11,6 |
| Test Peg configuration 4 | 13,9 | 63,6 | 22,5 |
| Aggrappoir control | 0,5 | 56,5 | 43,0 |
| Small : Medium : Large = ± 0,25 : 0,5 : 1,0 of berry skin area. | | | |

In the above "Aggrappoir" is the trade name for a conventional roll crushing machine.

The particle size reduction obtained with the machine of the invention is significantly different from and more favourable than that of the conventional machine.

Visual inspection of the grape pips from the machine of the invention showed no signs of increased damage relatively to those of the conventional machine. The pips were found to be free of flesh and this facilitated the settling and early separation of the pips during skin fermentation in red wine production.

The efficient stripping of the flesh resulted in a higher recovery of soluble solids, i.e. higher initial sugar, acid and other solute content in the must. The shredding of the skins resulted in a more efficient colour extraction during red wine fermentation and produced a wine of an enhanced colour.

In the case of white varieties especially the use of the machine of the invention yielded a wine with a more pronounced varietal character. Furthermore the must recovery increased while the must which was only suitable for distilling decreased.

I claim:

1. A fruit pulping machine comprising a rotatable surface and a stationary surface located at a fixed distance apart, a series of pegs projecting from each surface, an inlet for fruit at a first position where fruit is fed between the surfaces, and an outlet for pulp at a second position spaced from the first and so located that fruit moving from the first to the second positions intersect the line of movement of the pegs, the distance between the pegs and the distance between the tips of the pegs and the opposed surface being so chosen that the pips of the fruit are not damaged in passing between the pegs and between the pegs and the opposed surface and wherein the pegs are inclined to the surfaces, those on the rotatable surface being inclined towards the periphery of the surface and against the direction of rotation and those on the stationary surface being inclined towards the periphery of the surface and in the direction of rotation of the rotatable surface.

2. The machine claimed in claim 1 in which each peg makes an angle of 75° with the surface on which it is mounted.

3. The machine claimed in claim 1 in which each surface is a round disc, the inlet being towards the centers of the discs and the outlet towards their peripheries and rotation of the rotatable disc being about its center.

4. The machine claimed in claim 3 in which the discs are mounted about a horizontal axis.

5. The machine claimed in claim 3 in which the distances between the pegs are so chosen that each peg passes any other peg at a distance greater than the greatest expected pip dimension, and the spacing of the pegs decreases from the center towards the periphery of the discs.

6. The machine claimed in claim 5 in which the pegs are round cylindrical and the peg diameter decreases from the center towards the periphery of the discs.

7. A fruit pulping machine comprising first and second surfaces movable relatively to one another at a fixed distance apart, a group of round cylindrical pegs projecting from each surface, an inlet for fruit at a first position where fruit is fed between the surfaces, and an outlet for pulp at a second position spaced from the first position so located that fruit moving from the first to the second positions intersect the line of movement of the pegs and where the distances between the pegs are so chosen that each peg passes any other peg at a distance greater than the greatest expected pip dimension, the spacing of the pegs decreasing in the direction of the movement of the fruit from the inlet to the outlet.

8. A fruit pulping machine comprising first and second surfaces movable relatively to one another at a fixed distance apart, a group of round cylindrical pegs projecting from each surface, an inlet for fruit at a first position where fruit is fed between the surfaces, and an outlet for pulp at a second position spaced from the first position so located that fruit moving from the first to the second positions intersect the line of movement of the pegs and where the distances between the pegs are so chosen that each peg passes any other peg at a distance greater than the greatest expected pip dimension, the peg diameter decreasing in the direction of movement of the fruit from the inlet to the outlet.

* * * * *